United States Patent [19]

Culbertson

[11] 4,105,939
[45] Aug. 8, 1978

[54] DIRECT DIGITAL TECHNIQUE FOR GENERATING AN AC WAVEFORM

[75] Inventor: Charles H. Culbertson, Towson, Md.

[73] Assignee: Westinghouse Electric Corp., Pittsburgh, Pa.

[21] Appl. No.: 713,177

[22] Filed: Aug. 10, 1976

[51] Int. Cl.² .............................................. G05B 11/28
[52] U.S. Cl. .................................. 318/599; 307/265; 363/137
[58] Field of Search ..................... 307/265, 266, 267; 321/9 A; 318/599; 363/137

[56] References Cited

U.S. PATENT DOCUMENTS

| | | | |
|---|---|---|---|
| 3,614,590 | 10/1971 | Kernick | 321/9 A |
| 3,624,486 | 11/1971 | Oates | 321/9 A X |
| 3,649,902 | 3/1972 | Dunbar | 321/9 A |
| 3,766,497 | 10/1973 | Opal et al. | 321/9 A X |
| 4,028,609 | 6/1977 | Detering | 307/265 X |

Primary Examiner—B. Dobeck
Attorney, Agent, or Firm—M. P. Lynch

[57] ABSTRACT

A digital circuit employing a programmable read only memory (PROM) provides direct digital driving of semiconductor devices comprising a bridge circuit of an inverter to develop a predetermined AC output waveform. The combination of the programmable read only memory and an up-down counter provides the capability of stopping the output waveform at predetermined points as well as reversing the phase direction of the AC output waveform to thereby permit greater control of an electrical system driven by the AC output waveform.

4 Claims, 11 Drawing Figures

| WORD | OUTPUT | | | | WORD | OUTPUT | | | | WORD | OUTPUT | | | | WORD | OUTPUT | | | |
|---|---|---|---|---|---|---|---|---|---|---|---|---|---|---|---|---|---|---|---|
| | $Q_4$ | $Q_3$ | $Q_2$ | $Q_1$ | | $Q_4$ | $Q_3$ | $Q_2$ | $Q_1$ | | $Q_4$ | $Q_3$ | $Q_2$ | $Q_1$ | | $Q_4$ | $Q_3$ | $Q_2$ | $Q_1$ |
| 0 | 0 | 1 | 0 | 0 | 32 | 0 | 1 | 1 | 0 | 64 | 0 | 1 | 1 | 1 | 96 | 0 | 1 | 0 | 1 |
| 1 | 0 | 1 | 1 | 1 | 33 | 0 | 1 | 1 | 1 | 65 | 0 | 1 | 1 | 0 | 97 | 0 | 1 | 0 | 1 |
| 2 | 0 | 1 | 1 | 0 | 34 | 0 | 1 | 0 | 1 | 66 | 0 | 1 | 1 | 1 | 98 | 0 | 1 | 0 | 1 |
| 3 | 0 | 1 | 1 | 1 | 35 | 0 | 1 | 0 | 1 | 67 | 0 | 1 | 0 | 1 | 99 | 0 | 1 | 0 | 1 |
| 4 | 0 | 1 | 1 | 1 | 36 | 0 | 1 | 1 | 1 | 68 | 0 | 1 | 0 | 1 | 100 | 0 | 1 | 0 | 1 |
| 5 | 0 | 1 | 1 | 0 | 37 | 0 | 1 | 1 | 0 | 69 | 0 | 1 | 0 | 1 | 101 | 0 | 1 | 0 | 1 |
| 6 | 0 | 1 | 1 | 1 | 38 | 0 | 1 | 1 | 1 | 70 | 0 | 1 | 0 | 1 | 102 | 0 | 1 | 0 | 1 |
| 7 | 0 | 1 | 1 | 1 | 39 | 0 | 1 | 0 | 1 | 71 | 0 | 1 | 0 | 1 | 103 | 0 | 1 | 0 | 1 |
| 8 | 0 | 1 | 1 | 0 | 40 | 0 | 1 | 0 | 1 | 72 | 0 | 1 | 0 | 1 | 104 | 1 | 1 | 0 | 1 |
| 9 | 0 | 1 | 1 | 1 | 41 | 0 | 1 | 0 | 1 | 73 | 0 | 1 | 0 | 1 | 105 | 1 | 0 | 0 | 1 |
| 10 | 0 | 1 | 1 | 1 | 42 | 0 | 1 | 1 | 1 | 74 | 0 | 1 | 0 | 1 | 106 | 1 | 1 | 0 | 1 |
| 11 | 0 | 1 | 1 | 0 | 43 | 0 | 1 | 1 | 0 | 75 | 0 | 1 | 0 | 1 | 107 | 0 | 1 | 0 | 1 |
| 12 | 0 | 1 | 1 | 1 | 44 | 0 | 1 | 1 | 1 | 76 | 0 | 1 | 0 | 1 | 108 | 0 | 1 | 0 | 1 |
| 13 | 0 | 1 | 1 | 1 | 45 | 0 | 1 | 0 | 1 | 77 | 0 | 1 | 0 | 1 | 109 | 0 | 1 | 0 | 1 |
| 14 | 0 | 1 | 1 | 0 | 46 | 0 | 1 | 0 | 1 | 78 | 0 | 1 | 0 | 1 | 110 | 0 | 1 | 0 | 1 |
| 15 | 0 | 1 | 1 | 1 | 47 | 0 | 1 | 0 | 1 | 79 | 0 | 1 | 0 | 1 | 111 | 0 | 1 | 0 | 1 |
| 16 | 0 | 1 | 1 | 1 | 48 | 0 | 1 | 0 | 1 | 80 | 0 | 1 | 0 | 1 | 112 | 0 | 1 | 0 | 1 |
| 17 | 0 | 1 | 1 | 0 | 49 | 0 | 1 | 1 | 1 | 81 | 0 | 1 | 0 | 1 | 113 | 0 | 1 | 0 | 1 |
| 18 | 0 | 1 | 1 | 1 | 50 | 0 | 1 | 1 | 0 | 82 | 0 | 1 | 0 | 1 | 114 | 0 | 1 | 0 | 1 |
| 19 | 0 | 1 | 1 | 1 | 51 | 0 | 1 | 1 | 1 | 83 | 0 | 1 | 0 | 1 | 115 | 0 | 1 | 0 | 1 |
| 20 | 0 | 1 | 1 | 0 | 52 | 0 | 1 | 0 | 1 | 84 | 0 | 1 | 0 | 1 | 116 | 0 | 1 | 0 | 1 |
| 21 | 0 | 1 | 1 | 1 | 53 | 0 | 1 | 0 | 1 | 85 | 0 | 1 | 0 | 1 | 117 | 0 | 1 | 0 | 1 |
| 22 | 0 | 1 | 0 | 1 | 54 | 0 | 1 | 0 | 1 | 86 | 0 | 1 | 0 | 1 | 118 | 0 | 1 | 0 | 1 |
| 23 | 0 | 1 | 1 | 1 | 55 | 0 | 1 | 0 | 1 | 87 | 0 | 1 | 0 | 1 | 119 | 1 | 1 | 0 | 1 |
| 24 | 0 | 1 | 1 | 0 | 56 | 0 | 1 | 0 | 1 | 88 | 0 | 1 | 0 | 1 | 120 | 1 | 0 | 0 | 1 |
| 25 | 0 | 1 | 1 | 1 | 57 | 0 | 1 | 0 | 1 | 89 | 0 | 1 | 0 | 1 | 121 | 1 | 1 | 0 | 1 |
| 26 | 0 | 1 | 0 | 1 | 58 | 0 | 1 | 0 | 1 | 90 | 0 | 1 | 0 | 1 | 122 | 0 | 1 | 0 | 1 |
| 27 | 0 | 1 | 1 | 1 | 59 | 0 | 1 | 0 | 1 | 91 | 0 | 1 | 0 | 1 | 123 | 0 | 1 | 0 | 1 |
| 28 | 0 | 1 | 1 | 0 | 60 | 0 | 1 | 0 | 1 | 92 | 0 | 1 | 0 | 1 | 124 | 0 | 1 | 0 | 1 |
| 29 | 0 | 1 | 1 | 1 | 61 | 0 | 1 | 0 | 1 | 93 | 0 | 1 | 0 | 1 | 125 | 0 | 1 | 0 | 1 |
| 30 | 0 | 1 | 0 | 1 | 62 | 0 | 1 | 0 | 1 | 94 | 0 | 1 | 0 | 1 | 126 | 1 | 1 | 0 | 1 |
| 31 | 0 | 1 | 1 | 1 | 63 | 0 | 1 | 0 | 1 | 95 | 0 | 1 | 0 | 1 | 127 | 1 | 0 | 0 | 1 |

FIG. 4A

| WORD | Q4 | Q3 | Q2 | Q1 | WORD | Q4 | Q3 | Q2 | Q1 | WORD | Q4 | Q3 | Q2 | Q1 | WORD | Q4 | Q3 | Q2 | Q1 |
|---|---|---|---|---|---|---|---|---|---|---|---|---|---|---|---|---|---|---|---|
| 128 | 1 | 1 | 0 | 1 | 160 | 1 | 1 | 0 | 1 | 192 | 1 | 1 | 0 | 1 | 224 | 0 | 1 | 1 | 1 |
| 129 | 0 | 1 | 0 | 1 | 161 | 1 | 1 | 0 | 1 | 193 | 0 | 1 | 0 | 1 | 225 | 0 | 1 | 0 | 1 |
| 130 | 0 | 1 | 0 | 1 | 162 | 1 | 0 | 0 | 1 | 194 | 1 | 1 | 0 | 1 | 226 | 0 | 1 | 1 | 1 |
| 131 | 0 | 1 | 0 | 1 | 163 | 1 | 1 | 0 | 1 | 195 | 1 | 0 | 0 | 1 | 227 | 0 | 1 | 1 | 0 |
| 132 | 1 | 1 | 0 | 1 | 164 | 1 | 1 | 0 | 1 | 196 | 1 | 1 | 0 | 1 | 228 | 0 | 1 | 1 | 1 |
| 133 | 1 | 0 | 0 | 1 | 165 | 1 | 0 | 0 | 1 | 197 | 0 | 1 | 0 | 1 | 229 | 0 | 1 | 0 | 1 |
| 134 | 1 | 1 | 0 | 1 | 166 | 1 | 1 | 0 | 1 | 198 | 1 | 1 | 0 | 1 | 230 | 0 | 1 | 1 | 1 |
| 135 | 0 | 1 | 0 | 1 | 167 | 1 | 1 | 0 | 1 | 199 | 1 | 0 | 0 | 1 | 231 | 0 | 1 | 1 | 0 |
| 136 | 0 | 1 | 0 | 1 | 168 | 1 | 0 | 0 | 1 | 200 | 1 | 1 | 0 | 1 | 232 | 0 | 1 | 1 | 1 |
| 137 | 1 | 1 | 0 | 1 | 169 | 1 | 1 | 0 | 1 | 201 | 0 | 1 | 0 | 1 | 233 | 0 | 1 | 0 | 1 |
| 138 | 1 | 0 | 0 | 1 | 170 | 1 | 0 | 0 | 1 | 202 | 1 | 1 | 0 | 1 | 234 | 0 | 1 | 1 | 1 |
| 139 | 1 | 1 | 0 | 1 | 171 | 0 | 0 | 0 | 1 | 203 | 1 | 0 | 0 | 1 | 235 | 1 | 1 | 1 | 0 |
| 140 | 0 | 1 | 0 | 1 | 172 | 1 | 1 | 0 | 1 | 204 | 1 | 1 | 1 | 1 | 236 | 1 | 0 | 1 | 1 |
| 141 | 1 | 1 | 0 | 1 | 173 | 1 | 0 | 0 | 1 | 205 | 0 | 1 | 1 | 0 | 237 | 1 | 1 | 1 | 1 |
| 142 | 1 | 0 | 0 | 1 | 174 | 1 | 1 | 0 | 1 | 206 | 0 | 1 | 1 | 1 | 238 | 0 | 1 | 1 | 0 |
| 143 | 1 | 1 | 0 | 1 | 175 | 1 | 1 | 0 | 1 | 207 | 1 | 1 | 0 | 1 | 239 | 0 | 1 | 1 | 1 |
| 144 | 0 | 1 | 0 | 1 | 176 | 1 | 0 | 0 | 1 | 208 | 1 | 0 | 0 | 1 | 240 | 0 | 1 | 1 | 1 |
| 145 | 1 | 1 | 0 | 1 | 177 | 1 | 1 | 0 | 1 | 209 | 1 | 1 | 0 | 1 | 241 | 0 | 1 | 1 | 0 |
| 146 | 1 | 0 | 0 | 1 | 178 | 1 | 1 | 0 | 1 | 210 | 0 | 1 | 0 | 1 | 242 | 0 | 1 | 1 | 1 |
| 147 | 1 | 1 | 0 | 1 | 179 | 1 | 0 | 0 | 1 | 211 | 0 | 1 | 1 | 1 | 243 | 0 | 1 | 1 | 1 |
| 148 | 0 | 1 | 0 | 1 | 180 | 1 | 1 | 0 | 1 | 212 | 0 | 1 | 1 | 0 | 244 | 0 | 1 | 1 | 0 |
| 149 | 1 | 1 | 0 | 1 | 181 | 1 | 1 | 0 | 1 | 213 | 1 | 1 | 1 | 1 | 245 | 0 | 1 | 1 | 1 |
| 150 | 1 | 0 | 0 | 1 | 182 | 1 | 0 | 0 | 1 | 214 | 1 | 0 | 0 | 1 | 246 | 0 | 1 | 1 | 1 |
| 151 | 1 | 1 | 0 | 1 | 183 | 1 | 1 | 0 | 1 | 215 | 1 | 1 | 0 | 1 | 247 | 0 | 1 | 1 | 1 |
| 152 | 1 | 1 | 0 | 1 | 184 | 1 | 1 | 0 | 1 | 216 | 0 | 1 | 0 | 1 | 248 | 0 | 1 | 1 | 1 |
| 153 | 1 | 0 | 0 | 1 | 185 | 1 | 0 | 0 | 1 | 217 | 0 | 1 | 1 | 1 | 249 | 0 | 1 | 1 | 1 |
| 154 | 1 | 1 | 0 | 1 | 186 | 1 | 1 | 0 | 1 | 218 | 0 | 1 | 1 | 0 | 250 | 0 | 1 | 1 | 0 |
| 155 | 1 | 1 | 0 | 1 | 187 | 1 | 1 | 0 | 1 | 219 | 0 | 1 | 1 | 1 | 251 | 0 | 1 | 1 | 1 |
| 156 | 1 | 0 | 0 | 1 | 188 | 1 | 0 | 0 | 1 | 220 | 1 | 1 | 0 | 1 | 252 | 0 | 1 | 1 | 1 |
| 157 | 1 | 1 | 0 | 1 | 189 | 1 | 1 | 1 | 1 | 221 | 1 | 0 | 0 | 1 | 253 | 1 | 1 | 1 | 0 |
| 158 | 1 | 1 | 0 | 1 | 190 | 1 | 1 | 1 | 0 | 222 | 1 | 1 | 1 | 1 | 254 | 0 | 1 | 1 | 1 |
| 159 | 1 | 0 | 0 | 1 | 191 | 1 | 0 | 1 | 1 | 223 | 0 | 1 | 1 | 0 | 255 | 0 | 1 | 1 | 0 |

DIRECT DIGITAL TECHNIQUE FOR GENERATING AN AC WAVEFORM

BACKGROUND OF THE INVENTION

Typically, in applications requiring conversion of DC voltage to an AC or sine wave voltage waveform, an AC or sine wave reference signal is compared with a higher frequency sawtooth waveform to create a pulse width signal proportional to the reference waveform. The pulse width signal thus developed drives a power switching stage which converts DC voltage to the required AC, or sine wave voltage waveform.

There is disclosed herein with reference to the accompanying drawings a technique whereby the requirement for developing a reference AC waveform is eliminated.

SUMMARY OF THE INVENTION

In a disclosed embodiment, a low frequency, three phase AC output waveform is developed to drive the rod control mechanism of a nuclear reactor facility. Direct digital techniques are employed to develop a pulse width modulated drive signal which is applied directly to the power switching devices of a power stage to produce the desired AC output waveform. The disclosed embodiment utilizes digital integrated circuits including a clock oscillator circuit to drive an up-down counter circuit. A programmable read only memory responds to the up-down counter circuit by developing a digital output signal proportional to the required pulse width modulation drive signal for the power stage. The use of a conventional programmable read only memory and well known techniques for programming such circuits, permits the generation of a three-phase pulse width modulated output for driving the power stages to develop a desired three-phase AC output voltage waveform suitable for driving an electrical circuit such as that represented by the control rod drive mechanism of a nuclear reactor facility.

BRIEF DESCRIPTION OF THE DRAWINGS

The invention becomes more readily apparent from the following exemplary description in connection with the accompanying drawings:

FIGS. 4A and 4B are a logic level tabulation indicative of a programmable read only memory of FIG. 2.

DESCRIPTION OF THE PREFERRED EMBODIMENT

Figure 1:
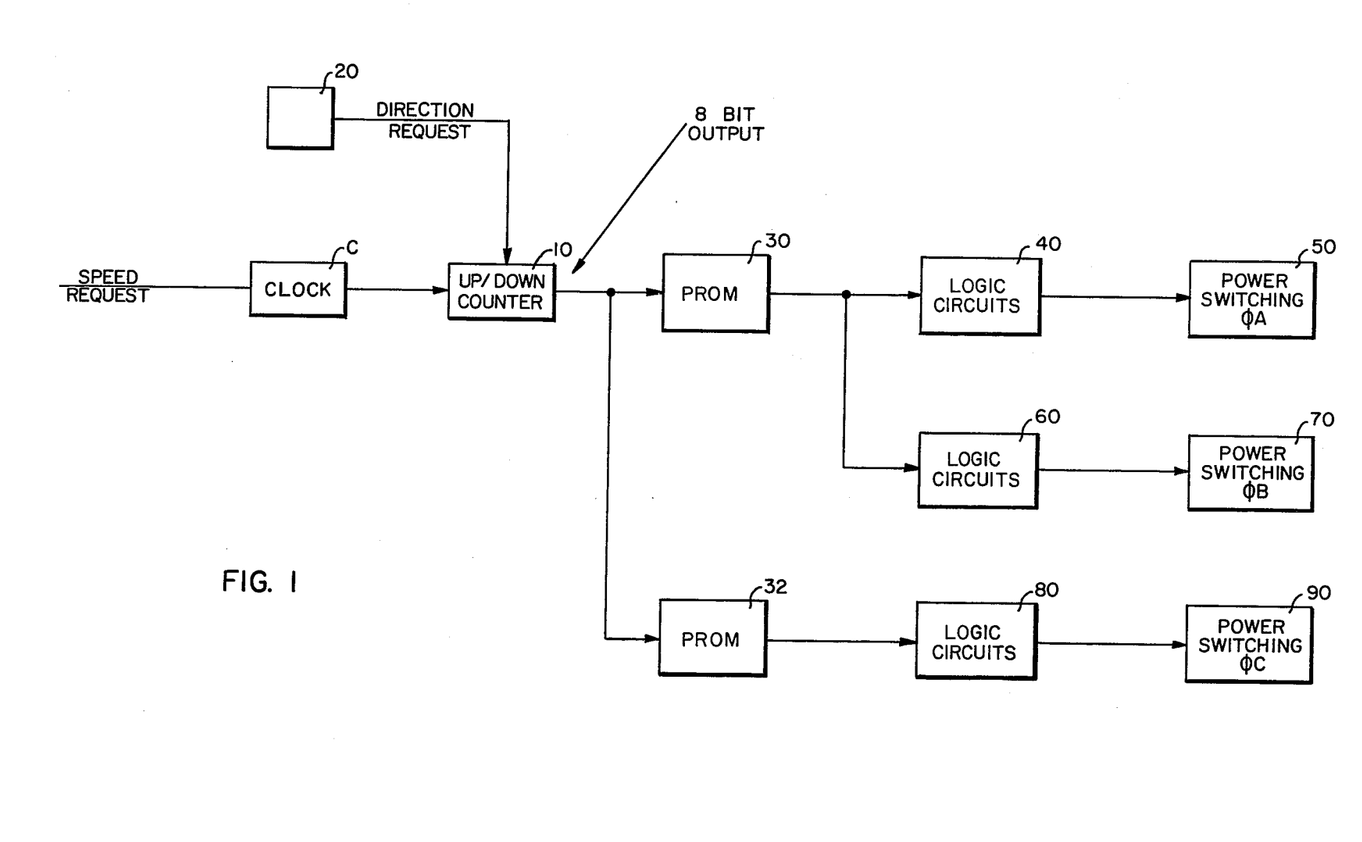
FIG. 1 is a block diagram schematic illustration of a typical embodiment of the invention.
Figure 3A:
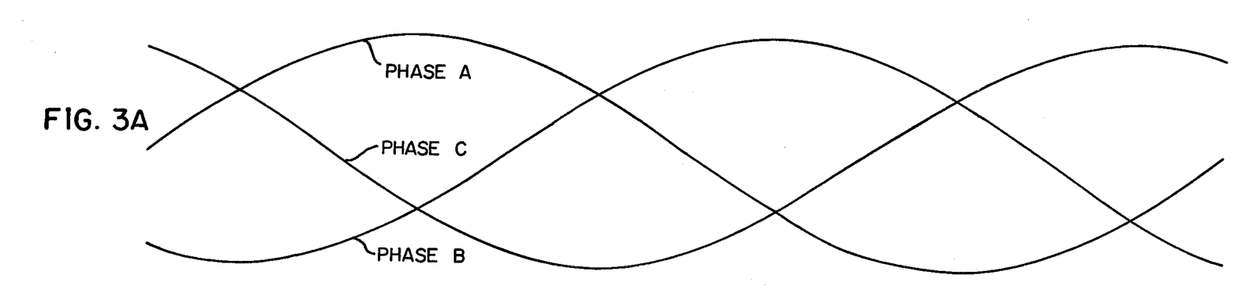
FIGS. 3A, 3B, 3C and 3D are waveform illustrations of the three-phase AC output signal developed by the embodiment of FIG. 2 in response to the digital pulse width modulation signal developed in accordance with the teachings of the invention.
Figure 3B:
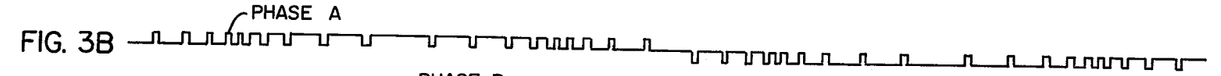
Figure 3C:
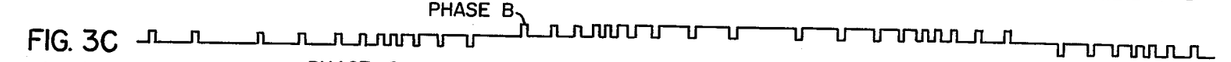
Figure 3D:
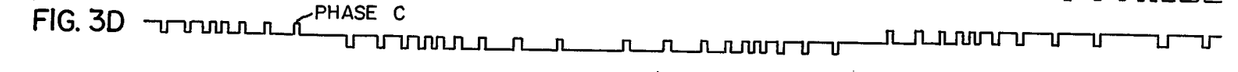

Referring to FIG. 1 there is illustrated in block diagram form, a typical embodiment of the invention wherein an up-down counter 10 is incremented by pulses from the clock oscillator circuit C in a direction determined by an input signal to the up-down counter 10 from the count direction circuit 20. The up-down counter 10 responds to the pulses from clock oscillator circuit C by developing an 8 bit output which is supplied to programmable read only memories 30 and 32. The programmable read only memories 30 and 32 are typically implemented through the use of commercial available circuits, such as the Signetics Model 82S29. The programmable read only memory typically provides four outputs and inasmuch as the on-off, direct digital technique disclosed herein requires only two programmable read only memory outputs per each of the three phases, programmable read only memory 30 responds to the output of the up-down counter 10 by providing a first pair of outputs to the logic circuit 40 associated with the power switching circuit 50 of phase A and a second pair of outputs to logic circuit 60 associated with the power switching circuit 70 of phase B. Programmable read only memory 32 responds to the output of the up-down counter 10 by developing the necessary pair of outputs for the logic circuit 80 associated with the power switching circuit 90 of phase C. The three-phase AC output waveform developed at the power switching circuits 50, 70 and 90 is illustrated in FIG. 3A while FIGS. 3B, 3C and 3D illustrate the pulse width modulated drive signals supplied to power switching circuits 50, 70 and 90 respectively in response to the combined operation of the up-down counter 10 and the programmable read only memories 30 and 32. For the purpose of discussion it will be assumed that the AC output waveforms developed by the power switching circuits 50, 70 and 90 are sine waves.

The concept embodied in FIG. 1 for providing a direct digital development of the AC output waveform of FIG. 3A without the use of a sine wave reference waveform is essentially insensitive to noise and voltage variations since the signal driving the power switching circuits 50, 70 and 90 is digital and no sine wave reference signal is employed. Significant flexibility is provided inasmuch as the degree of sine wave simulation achieved at the output of the power switching circuits 50, 70 and 90 can be changed by reprogramming the programmable read only memories 30 and 32 while changes in the frequency of the AC output waveform can be varied by adjusting the frequency of the output pulses from the clock oscillator circuit C.

A typical programming scheme of the programmable read only memory 30 to achieve the desired output waveform of phases A and B is illustrated in the tabulation of FIG. 4. The logic levels for phase A correspond to $Q_1$ and $Q_2$ while the logic levels for phase B correspond to $Q_3$ and $Q_4$. Each pulse from the clock oscillator circuit C either increases or decreases the word location by one depending on the direction of rotation requested by switch S.

A similar programming scheme can be developed for programmable read only memory 32 to develop the logic levels for phase C.

Figure 2:
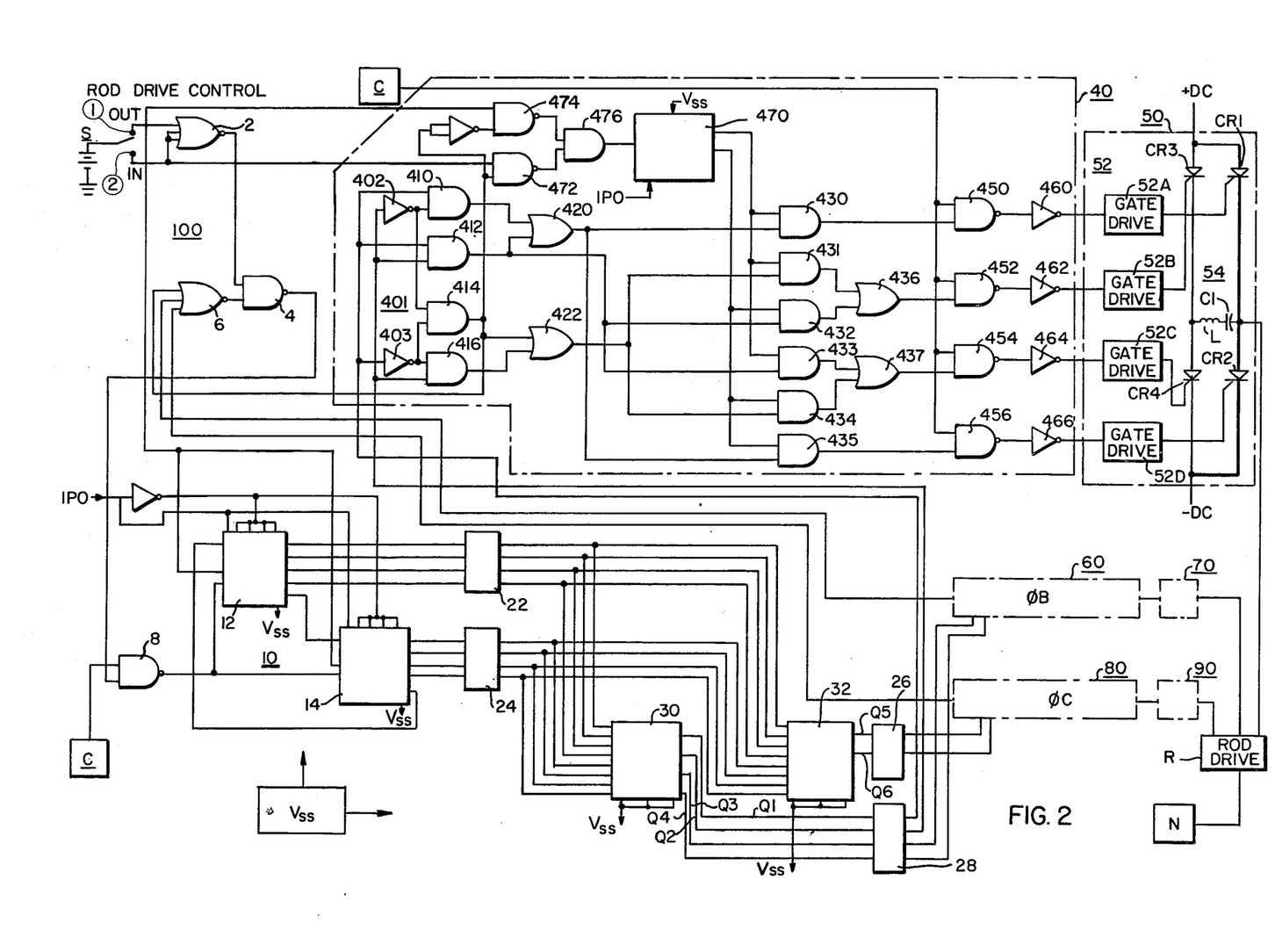
FIG. 2 is a detail schematic illustration of the embodiment of FIG. 1.

A typical implementation of the invention illustrated in FIG. 1 for use in controlling the rod position of a nuclear reactor is illustrated schematically in FIG. 2. A rod drive selector switch S at position 1 activates operation of the AC voltage waveform system 100 to affect OUT movement of the control rods by the rod drive mechanism R of the nuclear reactor N. Setting the switch S at position 2 will produce an AC output waveform affecting an IN movement of the control rods by the rod drive mechanism R. The position of the rod drive selector switch S determines the direction of count of the up-down counter 10 and the output of the programmable read only memories 30 and 32. The output of the programmable read only memories 30 and 32 in turn determines the conduction sequence of the power switching circuits 50, 70 and 90 effected by logic circuits 40, 60 and 80 respectively.

Inasmuch as the structure and function of the logic circuits 40, 60 and 80 and the power switching circuit of each of the three phases is identical, the discussion of FIG. 2 will be limited to phase A for the purpose of clarity.

The count direction signal corresponding to the signal developed by the rod drive control switch S, is supplied through NOR gate 2 as an input to NAND gate 4. A second input to NAND gate 4 corresponds to the output from NOR gate 6 which has as its input, signals from the logic circuits 40, 60 and 80 respectively. These input signals are derived from the logic circuits as in the schematic illustration of the logic circuit 40 and correspond to a stop-count value indicative of a point on the AC output waveform from the power switching circuit 60 where a constant DC level is to be maintained indicative of no movement of the control rods.

When the signal from switch S is removed an output continues to be present from NAND gate 4 until one of the inputs to NOR gate 6 forces its output to go to a high level at which time the output of NOR gate 4 will go low and rod motion will stop. The three inputs to NOR gate 6 correspond to three preselected count levels representing stopping points on the output waveforms. The output of NAND gate 4 is supplied as one input to the NAND gate 8. A second input to NAND gate 8 corresponds to the output pulses from the clock oscillator circuit C which in turn are gated through NAND gate 8 to the up-down counter stages 12 and 14 comprising the up-down counter 10. NOR gates 2 and 6 can be implemented through the use of RCA circuit CD4000A, while the NAND gates 4 and 8 can be implemented through the use of RCA circuit CD4011A. The up-down counter stages 12 and 14 selected for the purposes of illustrating the embodiment of the inventions consist of RCA counter circuits CD4029A.

Either an IN or an OUT signal from the rod drive control switch S activates up-down counter stage 14 via NAND gate 8 causing the up-down counter 14 to be incremented in response to the clock pulses from the clock oscillator circuit C. The occurrence of an IN signal results in the up-down counter stage 14 being incremented in a first direction while the presence of an OUT signal causes the clock pulses to increment the up-down counter stage in the opposite direction. The change in direction of the counting sequence of the up-down counter stages 12 and 14 in response to an OUT signal is controlled by the rod control drive switch S.

The IPO (initial power on) signal is an interlock signal which permits the system voltage levels to stabilize and logic signals to assume the required states prior to operation of the system 100.

The up-down counter stages 12 and 14 have been typically chosen to be four stage binary counters such that every 16 count output from up-down stage 12 initiates a count in the up-down counter stage 14 such that the total count capacity of the combination of up-down counter stages 12 and 14 is an eight stage output of a count capacity of 256. The four stage outputs of up-down counter stage 12 and the four stage outputs of up-down counter stage 14 are transmitted through buffer converter circuits 22 and 24 respectively to form inputs to both the programmable read only memory 30 and the programmable read only memory 32. The incorporation of the buffer counter circuits 22 and 24, which may be typically implemented through the use of RCA circuit CD4050A, is optional. The function of the buffer converter circuits 22 and 24 is that of a "transformer" to make the output voltage levels of the up-down counter stages 12 and 14 compatible with the input voltage characteristics of the programmable read only memories 30 and 32 in the event the circuits employed are not directly compatible. In the embodiment illustrated, the programmable read only memory circuit selected for the purposes of illustration is a commercially available Signetics Model 82S29. The selection of commercially available components disclosed thus far, require the buffer converter circuits 22 and 24 to step down the 15 volt levels from the up-down counter stages 12 and 14 to a 5 volt level compatible with the selected programmable read only memories 30 and 32. Conversely, the buffer converter circuits 26 and 28 coupling the outputs of the programmable read only memories 30 and 32 to the logic circuits 40, 60 and 80 respectively function to step up the 5 volt output levels from the selected programmable read only memories 30 and 32 to a 15 volt logic level compatible with the logic circuits. The supply voltage for the various logic circuits and components is provided by the voltage supply source $V_{SS}$.

As indicated above, each logic circuit is driven by two outputs from a programmable read only memory corresponding to ON and OFF logic levels, to produce the desired AC output waveform. Thus, the logic level output signals $Q_1$ and $Q_2$ of programmable read only memory 30 are transmitted through the buffer converter circuit 28 and supplied as the logic control inputs to the logic circuit 40 of phase A while the logic level outputs $Q_3$ and $Q_4$ of the programmable read only memory 30 are supplied via the buffer converter circuit 28 as the logic control inputs to the logic circuit 60 of phase B. The logic output levels $Q_5$ and $Q_6$ of the programmable read only memory 32 are supplied as the logic control input signals to the logic circuit 80 of phase C. As noted above, inasmuch as the circuitry and operation of the logic circuits and power switching circuits of each of the phases is identical, the following discussion will be limited to the detail operation of the logic circuit 40 and the power switching circuit 50 of phase A as controlled by the logic level outputs $Q_1$ and $Q_2$ of the programmable read only memory 30. It is apparent, that if a commercially available programmable read only memory was selected which provided six outputs, the function of the programmable read only memories 30 and 32 could be satisfied by a single programmable read only memory providing the necessary three pairs of logic level outputs required to control the operation of the logic circuits and power switching circuits of each of the three phases A, B, and C were developed in accordance with the teachings of this invention.

The logic circuit 40 functions to respond to the pair of logic control signals $Q_1$ and $Q_2$ by developing four logic level outputs for activating conventional gate drive circuit 52 to control the ON/OFF conduction of the power switching devices $CR_1$, $CR_2$, $CR_3$, and $CR_4$ comprising a bridge circuit 54 of the power switching circuit 50.

The sequence and duration of the conduction of the power switching devices $CR_1$, $CR_2$, $CR_3$ and $CR_4$ developed by the gate drive circuits 52 is determined by the program of the programmable read only memory 30.

The programmable read only memory 30 is programmed in accordance with well-known techniques to respond to the output logic levels of the up-down counter 10 to develop output logic levels corresponding to signals $Q_1$ and $Q_2$ to effect a digital pulse width modulated signal via logic circuit 40 to develop an AC output waveform from the power switching circuit 50 in accordance with the waveforms of FIGS. 3A and 3B.

Figure 3E:
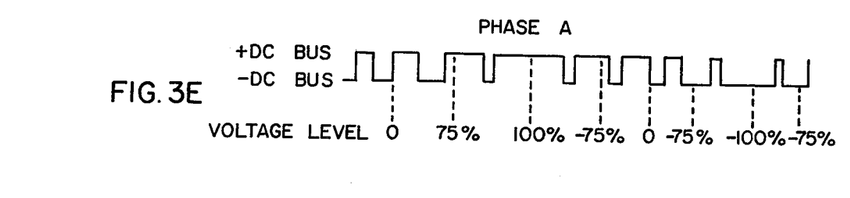

FIGS. 3C and 3D illustrate typical ON-OFF conduction patterns of the power switching devices of circuits 70 and 90 to develop the sine wave outputs for phases B and C. An alternate conduction pattern is illustrated in FIG. 3E. This pattern maintains a voltage connection with either the positive or negative AC bus voltage.

The sine wave output of phase A is developed in accordance with the following operation of the power switching circuit 50 consistent with the programming scheme of FIG. 4:

| Logic Levels | | Power Switching | Circuit Conduction |
|---|---|---|---|
| $Q_1$ | $Q_2$ | 0° to 180° | 180° to 360° |
| 0 | 0 | CR3 | CR4 |
| 1 | 1 | CR1 and CR4 | CR2 and CR3 |
| 1 | 0 | CR1 | CR2 |
| 0 | 1 | CR3 | CR4 |

The conditions 0, 0 of $Q_1$ and $Q_2$ also indicates the conditions where the logic is shifted from the positive voltage (0°–180°) to the negative voltage (180°–360°). This provides efficient use of the programmable read only memory since the same 256 words are used for both the positive and negative portions of the sine wave output.

Figure 5A:
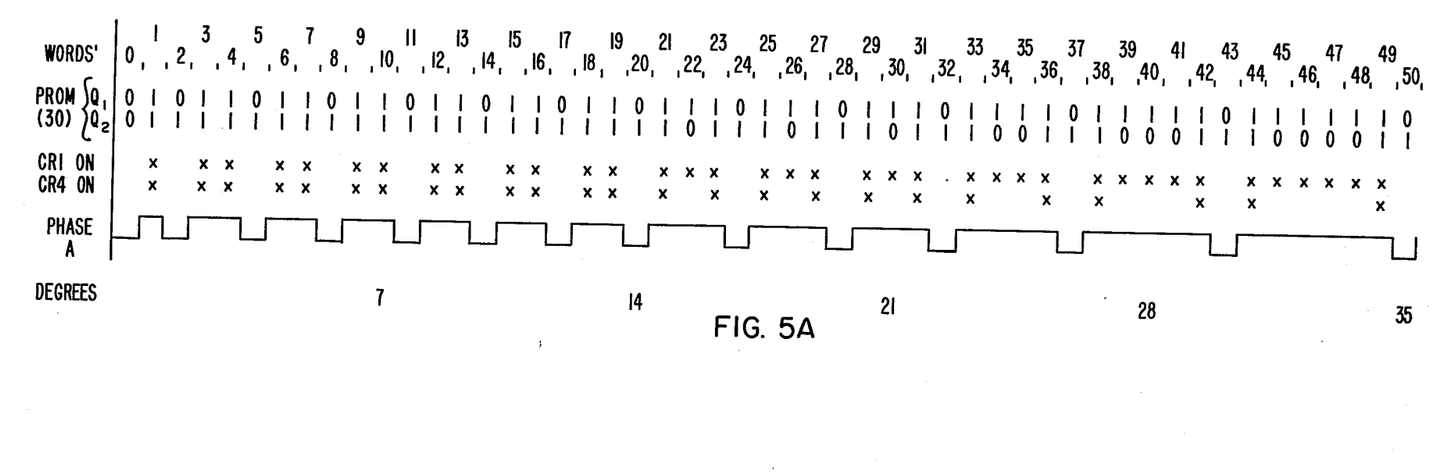
FIGS. 5A and 5B are graphical illustrations of the conduction control of power switching devices of FIG. 2 by the outputs of the programmable read only memory.
Figure 5B:
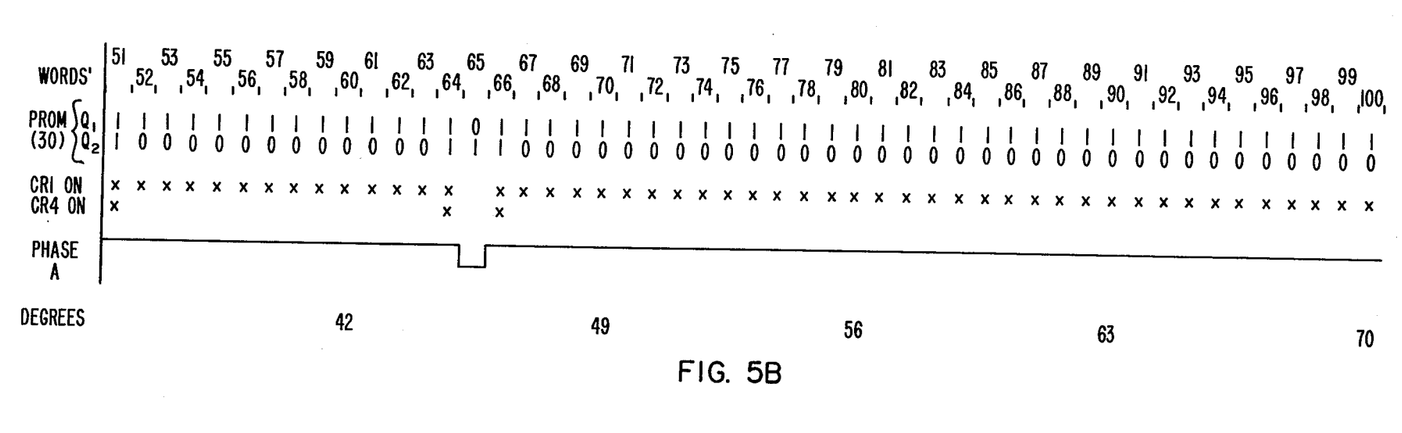

The operational relationship between the outputs $Q_1$ and $Q_2$ of the programmable read only memory 30 and the power switching devices of the power switching circuit 50 is illustrated in FIG. 5.

The signals $Q_1$ and $Q_2$ of the programmable read only memory 30 are supplied to a logic network 401 consisting of inverters 402 and 403, and gates 410, 412, 414 and 416, and OR gates 420 and 422. The inverters 402 and 403 can be typically implemented through the use of RCA circuit CD4009A, the AND gates through the use of RCA circuit CD4011A and the OR gates through the use of RCA circuit CD4071B. The operation of the logic network 401 is depicted in the following truth table.

| LOGIC OUTPUT LEVELS | | | | |
|---|---|---|---|---|
| $Q_1$ | $Q_2$ | Gate 420 | Gate 412 | Gate 422 |
| 1 | 0 | 1 | 0 | 0 |
| 1 | 1 | 1 | 1 | 0 |
| 0 | 1 | 0 | 0 | 1 |
| 0 | 0 | 0 | 0 | 1 |

The following truth table illustrates the response of the logic circuit 40 to input signals to develop output signals for controlling the conduction of the power switching devices of the power switching stage 54.

| | INPUT SIGNALS | | | | | OUTPUT SIGNALS | | | |
|---|---|---|---|---|---|---|---|---|---|
| | Clock | PROM 30 | | Switch S | | | Inverters | | |
| | C | $Q_1$ | $Q_2$ | Out | In | IPO | 460 | 462 | 464 | 466 |
| 0°–180° | 1 | 1 | 0 | 1 | 0 | 0 | 1 | 0 | 0 | 0 |
| | 1 | 1 | 0 | 0 | 1 | 0 | 1 | 0 | 0 | 0 |
| | 1 | 1 | 1 | 1 | 0 | 0 | 1 | 0 | 1 | 0 |
| | 1 | 1 | 1 | 0 | 1 | 0 | 1 | 0 | 1 | 0 |
| | 1 | 0 | 1 | 1 | 0 | 0 | 0 | 1 | 0 | 0 |
| | 1 | 0 | 1 | 0 | 1 | 0 | 0 | 1 | 0 | 0 |
| | 1 | 0 | 0 | 1 | 0 | 0 | 0 | 1 | 0 | 0 |
| | 1 | 0 | 0 | 0 | 1 | 0 | 0 | 1 | 0 | 0 |
| 180°–360° | 1 | 1 | 0 | 1 | 0 | 0 | 0 | 0 | 0 | 1 |
| | 1 | 1 | 0 | 0 | 1 | 0 | 0 | 0 | 0 | 1 |
| | 1 | 1 | 1 | 1 | 0 | 0 | 0 | 1 | 0 | 1 |
| | 1 | 1 | 1 | 0 | 1 | 0 | 0 | 1 | 0 | 1 |
| | 1 | 0 | 1 | 1 | 0 | 0 | 0 | 0 | 1 | 0 |
| | 1 | 0 | 1 | 0 | 1 | 0 | 0 | 0 | 1 | 0 |
| | 1 | 0 | 0 | 1 | 0 | 0 | 0 | 0 | 1 | 0 |
| | 1 | 0 | 0 | 0 | 1 | 0 | 0 | 0 | 1 | 0 |

Note:
1) Anytime the output of clock oscillator circuit C is 0, all outputs are 0.
2) Anytime the IPO signal is 1, the initial operating condition of the system 100 is set.

The above truth table defining the operation of logic circuit 40 is developed in accordance with the following logic requirements:

(1) Flip-flop circuit 470 determines whether logic circuit 40 is operating in the 0°–180° or 180°–360° portion of the sine wave output. A change is a function of switch S. A change occurs when $Q_1$ and $Q_2$ are both 0.

(2) In the 0°–180° portion of the sine wave power switching device CR1 is turned on but prior to each commutation off by the power switching device CR3, the power switching device CR4 must be turned on to charge the commutating circuit.

(3) In the 180°–360° portion of the sine wave power switching device CR2 is turned on, but prior to each commutation off by power switching device CR4, the power switching device CR3 must be turned on to charge the commutating circuit.

When the signals $Q_1$ and $Q_2$ are both logic 1, the output logic level of AND gate 412 supplied to OR gate 420 will produce an output logic level to AND gate 430 to gate clock oscillator pulses through NAND gate 450 which in turn actuates gate drive circuit 52A providing a logic 1 level is transmitted from fip-flop circuit 470 as an enabling input to AND gate 430.

The flip-flop circuit 470 serves to reverse the polarity of the simulated sine wave. For the positive portion (0°–180° of phase A) output Q is at the 1 level enabling AND gates 430, 431 and 433. For the negative portion (180°–360° of phase A) output $\overline{Q}$ is at the 1 level enabling AND gates 432, 434 and 435. The flip-flop circuit 470 triggered any time the output of AND gate 414 goes from 1 to 0 with switch S at position 1 and a logic 1 supplied through NAND gate 474. The flip-flop 470 is triggered any time the output of AND gate 414 goes from 0 to 1 with switch S at position 2 and a logic 1 supplied through NAND gate 472. While the embodiment of FIG. 2 utilizes clock oscillator pulses from clock oscillator circuit C to develop an ON/OFF "picket drive" for the gate drive circuit 52, a continuous gate drive could be substituted for the clock pulse signal as an input to the NAND gates 450, 452, 454 and 456. When $Q_1$ and $Q_2$ are respectively 1, 1 or 1, 0 the gate drive circuit 52A responds to the output of NAND gate 450 which is supplied through inverter 460, by gating the power switching device CR1 to a state of conduction. At the instant $Q_1$ and $Q_2$ are 1, then the power switching device CR4 in the opposite leg of the bridge circuit 54 also receives a signal via AND 433, OR gate 437, NAND gate 454, inverter 464 and gate drive circuit 52C to charge the commutating circuit consisting of inductor L and capacitor C1.

The logic condition where the logic control signals $Q_1$ and $Q_2$ are both logic zeros, corresponds to the zero crossing point of the AC output waveform from the power switching circuit 50 and is employed to both reverse the power switching pattern of the bridge circuit 54 as well as identify an allowable stop point on the AC output waveform.

When the logic control signals $Q_1$ and $Q_2$ correspond to logic levels 0, 1 or 0, 0, the logic network 401 develops logic level outputs causing power switching device CR3 to be conductive and power switching device CR1 to become nonconductive. The combination of logic levels for signals $Q_1$ and $Q_2$ of 1, 0 or 1, 1 develops logic level outputs from the logic network 401 causing the power switching device CR1 to become conductive.

The NAND gates 472, 474 and 476 connected to the input of flip-flop circuit 470 respond to logic levels of 0, 0 for signals $Q_1$ and $Q_2$ by causing the flip-flop 470 to change state in response to a polarity change in the AC output waveform thereby causing the control rectifier CR4 to become conductive in the negative portion of the AC waveform in place of power switching device CR1 and the functions of CR3 and CR4 are reversed.

Remembering that a logic 1 level fires the gate drive circuit and the associated power switching device, logic components 430 through 437 and 450, 452, 454, 456, 460, 462, 464, 466 of FIG. 2 can best be summarized by the TRUTH table given below.

| INPUT | | | | OUTPUT | | | |
|---|---|---|---|---|---|---|---|
| 412 | 420 | 422 | 470 | 460 | 462 | 464 | 466 |
| | | | Q | $\bar{Q}$ | Fires CR1 | Fires CR3 | Fires CR4 | Fires CR2 |
| 1 | 0 | 0 | 1 | 0 | 0 | 1 | 0 | 0 |
| 1 | 0 | 0 | 0 | 1 | 0 | 0 | 1 | 0 |
| 0 | 1 | 0 | 1 | 0 | 1 | 0 | 0 | 0 |
| 0 | 1 | 0 | 0 | 1 | 0 | 0 | 0 | 1 |
| 1 | 1 | 0 | 1 | 0 | 1 | 0 | 1 | 0 |
| 1 | 1 | 0 | 0 | 1 | 0 | 1 | 0 | 1 |
| 0 | 0 | 1 | 1 | 0 | 0 | 1 | 0 | 0 |
| 0 | 0 | 1 | 0 | 1 | 0 | 0 | 1 | 0 |

What is claimed is:

1. Apparatus for direct digital conversion of DC voltage to an AC output waveform without the use of an AC reference waveform, comprising, pulse generator means for producing clock pulses, counter means connected to said pulse generator means and being incremented by said clock pulses and producing a digital output indicative of the count value produced by said clock pulses, a programmable read only memory means responsive to said digital output of said counter means to develop a pair of logic control signals corresponding to combinations of logic ONES and ZEROS in a pattern sequence indicative of a preprogrammed AC waveform, said programmable read only memory means including a predetermined number of stored words, each incremental change in the count value of said counter means producing a digital output from said counter means which addresses a different stored word, each stored word producing a predetermined pair of logic control signals, and logic circuit means operatively coupling said programmable read only memory means to a DC voltage power stage consisting of a plurality of power switching devices, said logic circuit means responding to said logic control signals by controlling the conduction of said power switching devices to produce a pulse width modulated output from said DC voltage power stage corresponding to said preprogrammed AC waveform.

2. Apparatus as claimed in claim 1 wherein the same predetermined number of stored words is employed to develop the pattern sequence for both the positive and negative half cycles of said pre-programmed AC waveform and further including a polarity control means operatively connected to said logic circuit means to initiate a change in the polarity of the pulse width modulated output in response to a predetermined pair of logic control signals.

3. Apparatus for direct digital conversion of DC voltage to a three phase AC output without the use of an AC reference waveform, comprising, pulse generator means for producing clock pulses, up-down counter means connected to said pulse generator means and being incremented by said clock pulses and producing a digital output indicative of the count value produced by said clock pulses, selector means operatively connected to said up-down counter means to establish said up-down counter means in either an up count mode or a down count mode, programmable read only means responsive to said digital output of said up-down counter means to develop a first, second and third pair of logic control signals, each pair corresponding to combinations of logic ONES and ZEROS in a pattern sequence indicative of a pre-program AC waveform corresponding to the first, second and third phase AC waveforms respectively of a desired three-phase AC output, and logic circuit means operatively coupling said programmable read only memory means to first, second and third DC voltage power stages, each consisting of a plurality of power switching devices, said logic circuit means responding to said first pair of logic control signals by controlling the conduction of the power switching devices of said first DC voltage power stage to produce a pulse width modulated output corresponding to the pre-programmed AC waveform of said first phase, said logic circuit means responding to said second pair of logic control signals by controlling the conduction of the power switching devices of said second DC voltage power stage to produce a pulse width modulated output corresponding to the pre-programmed AC waveform of said second phase, said logic circuit means responding to said third pair of logic control signals by controlling the conduction of the power switching devices of said third DC voltage power stage to produce a pulse width modulated output corresponding to the pre-programmed AC waveform of said third phase, and a bidirectional electrical drive means being driven by the three phase AC output developed by said first, second and third DC voltage power stages, said bidirectional electrical drive means being driven in a first direction in response to an up count mode of operation established by said selector means and being driven in the opposite direction in response to a down count mode of operation.

4. Apparatus as claimed in claim 3 wherein said logic circuit means includes means for responding to predetermined pairs of logic control signals by developing a constant DC output voltage from said DC voltage power stages to selectively stop the movement of the bidirectional electrical drive means.

* * * * *